H. L. TANNER.
DAMPING MEANS FOR GYROSCOPIC COMPASSES.
APPLICATION FILED AUG. 7, 1917.
1,330,501.
Patented Feb. 10, 1920.
3 SHEETS—SHEET 3.
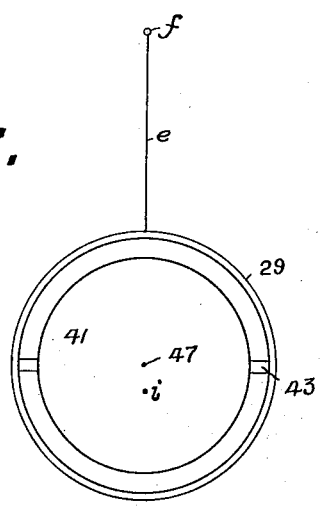
Fig. 8.
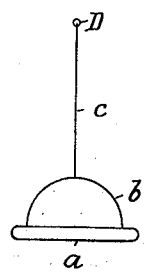
Fig. 10.
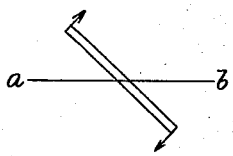
Fig. 11.
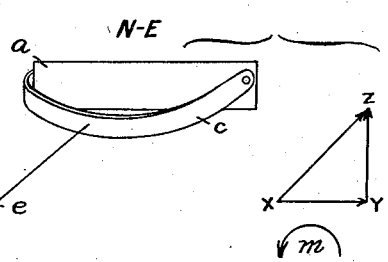
Fig. 9.
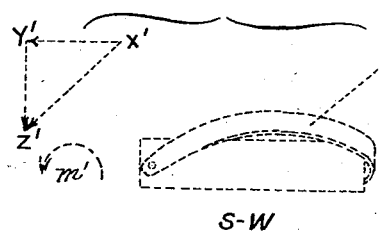
INVENTOR
Harry L. Tanner.
BY Herbert H. Thompson
ATTORNEY.

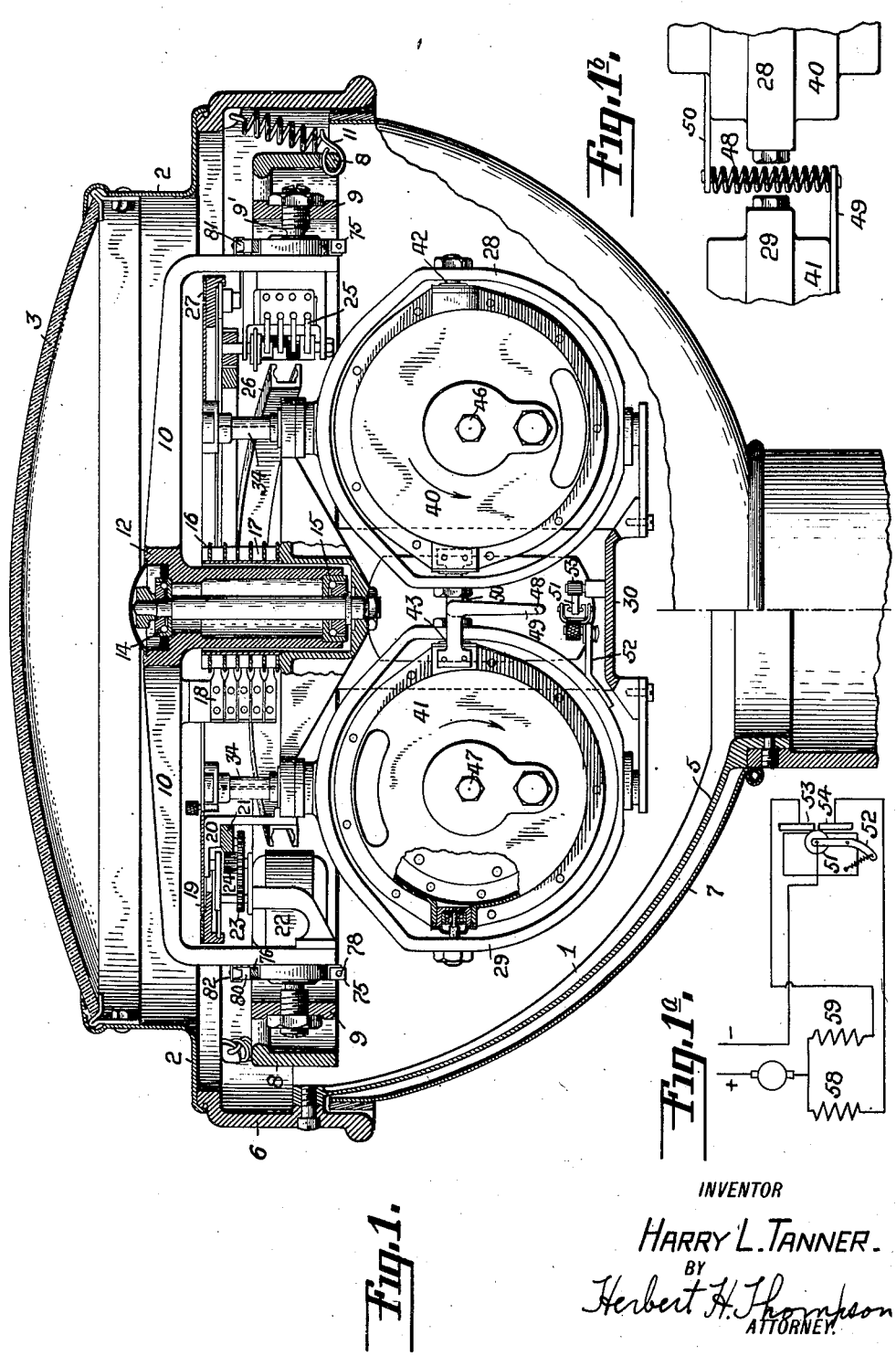

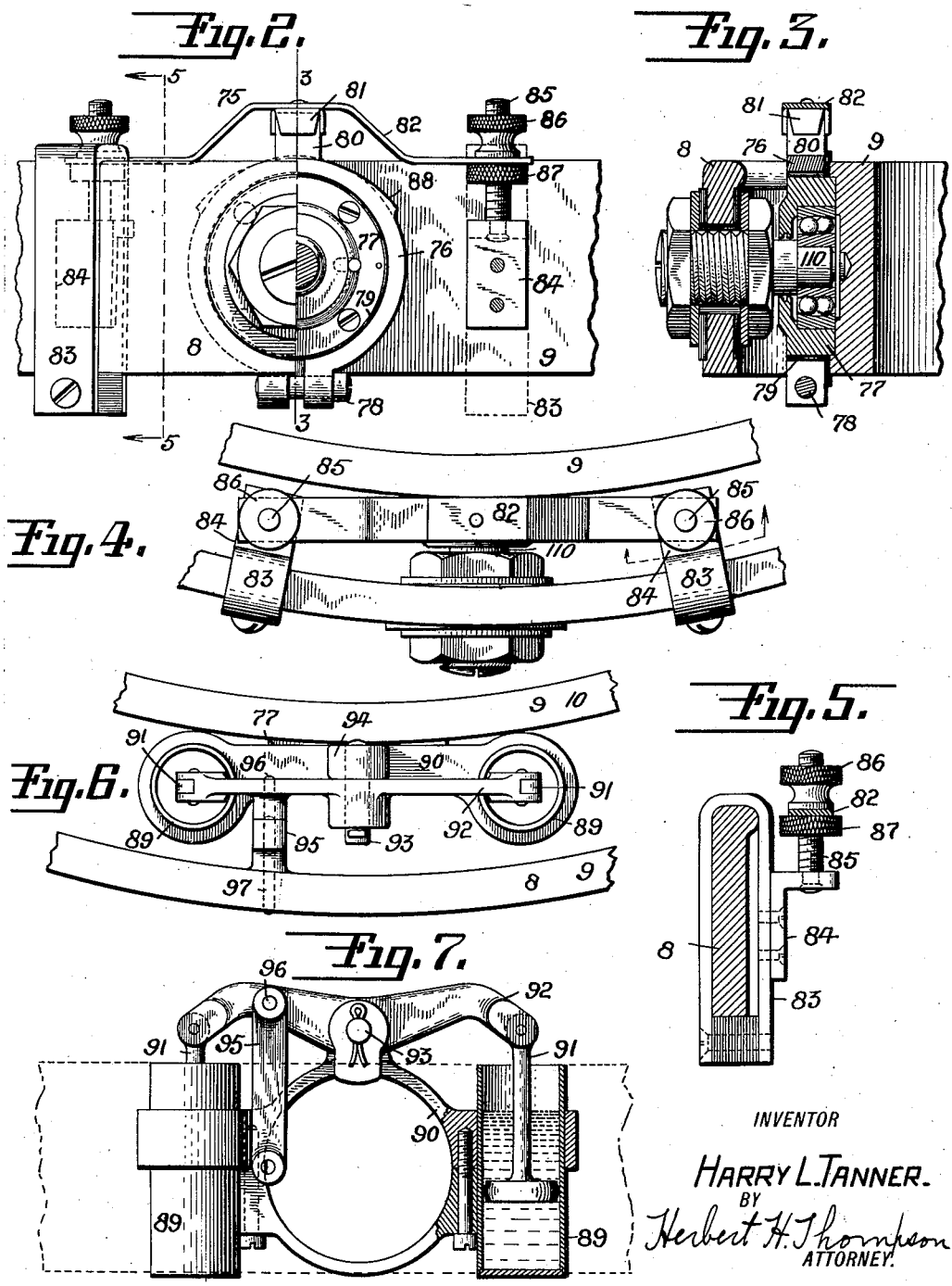

UNITED STATES PATENT OFFICE.

HARRY L. TANNER, OF BROOKLYN, NEW YORK, ASSIGNOR TO THE SPERRY GYROSCOPE COMPANY, OF BROOKLYN, NEW YORK, A CORPORATION OF NEW YORK.

DAMPING MEANS FOR GYROSCOPIC COMPASSES.

1,330,501.          Specification of Letters Patent.          Patented Feb. 10, 1920.

Application filed August 7, 1917. Serial No. 184,815.

*To all whom it may concern:*

Be it known that I, HARRY L. TANNER, a citizen of the United States of America, residing at 1144 East 19th street, Brooklyn, in the county of Kings and State of New York, have invented certain new and useful Improvements in Damping Means for Gyroscopic Compasses, of which the following is a specification.

This invention relates to gyro-navigational instruments and is designed to prevent damage to the instrument parts and inaccuracies in indication due to the rolling and pitching of the vessel on which such an instrument may be mounted.

Referring to the drawings which illustrate what I now consider the preferred forms of the invention:

Figure 1 is a central sectional elevation of a gyroscopic compass with one form of my invention applied thereto.

Fig. 1ᵃ is a wiring diagram of a motor employed in the compass illustrated.

Fig. 1ᵇ is a fragmentary detail plan view of certain of the parts illustrated in Fig. 1.

Fig. 2 is a fragmentary detail elevation of one form of my invention, one of the Cardan or gimbal rings being partly cut away.

Fig. 3 is a section taken on the line 3—3 of Fig. 2.

Fig. 4 is a plan view of the parts shown in Fig. 2.

Fig. 5 is a section taken on the line 5—5 of Fig. 2.

Fig. 6 is a fragmentary plan view of a modified form of my invention.

Fig. 7 is a fragmentary elevation, partly in section, of the parts shown in Fig. 6.

Figs. 8 to 11 are diagrammatic views employed in explaining my invention.

The invention is applicable to various forms of gyro compasses. I have illustrated the preferred form of the invention as applied to a two-gyro compass (see Fig. 1).

The compass is shown as mounted in a bowl-shaped stand 1, which is provided with a removable cover 2, having a glass top 3. The stand is supported on a standard 4 from which ribs 5 extend to support the ring 6. The shell 7 of the bowl is made removable so that it can be lowered to inspect the compass. The outer gimbal ring 8 within which the inner ring 9 is pivotally supported on pivots 110 (see Fig. 3) may be suspended from ring 6 by means of springs 11. The spider 10 is in turn pivoted to ring 9 by pivots 9' at right angles to said other pivots. The spider 10 is provided with a central elongated bearing member 12 which serves to support the azimuth movable unit 30 for rotation about a vertical axis. For this purpose the compass unit is provided with a vertical stem journaled within bearing member 12 in anti-friction suspension bearings 14 and 15. The rotatable unit 30 is provided with an extension 16 which may surround member 12 and is provided with collector rings 17, adapted to lead current to the rotatable unit from brushes 18 fixed to the spider 10.

The compass card 19 is shown as supported from the rotatable unit by means of brackets 20, which may also serve to support the large gear 21. A motor 22 fixed to the spider 10 is adapted to drive said gear through gearing 23, 24. Said gear may also serve to rotate a transmitter 25 by means of which the readings of the compass may be sent to repeating instruments. The rotatable unit is also preferably provided with a cam ring 26 which coöperates with mechanism (not shown) to introduce corrections in the reading of the compass for variations in ship's speed, heading and latitude by shifting the position of the lubber ring 27.

The gyroscopic units proper, are shown as mounted within vertical rings 28 and 29, which are pivotally supported about their vertical axes within the main frame 30. Preferably both rings are suspended by means of wires 34, 34' from the frame. The suspension wires 34 of the gyro 41 which rotates in the direction usually employed in gyro compasses is as flexible as possible while the wire 34' for the oppositely rotating gyro 40 is more in the nature of a torsion wire so that it will exert an appreciable centralizing effect upon the vertical ring.

The rotor casings 40 and 41 are pivoted on horizontal axes 42 and 43 within their respective vertical rings 28 and 29. In the embodiment shown, the rotor within casing 41 is adapted to be driven in the direction of the arrow, *i. e.*, in the direction in which gyro compasses are ordinarily driven, while the rotor within the casing 40 is adapted to be oppositely driven, so that this rotor is in an unstable condition. In Fig. 1 the spinning axes of the rotors 46, 47 are perpendicular to the plane of the paper. Both casings are pendulous, but the casing 40 is more pendulous than the casing 41. A spring 48 is secured to arms 49 and 50 of the two gyroscopes.

Operable between gyroscope 41 and a point on frame 30, are electric contacts 51, 53, 54. The trolley or brush 51 is mounted upon an arm 52 extending from ring 29 while the contacts 53, 54 are secured to frame 30. The last mentioned contacts control the energization of one or the other of oppositely wound field coils 58, 59 of motor 22 to cause the latter to run in one direction or the other (see Fig. 1ª).

The theory of operation of the compass above described is fully described in the U. S. application for Letters Patent Serial No. 110,020, filed July 19, 1916, by Harry L. Tanner.

Compasses are used principally on board ship and accordingly should be free from error and injury due to rolling or pitching of the vessel. As in other types of gyro-compasses the system suspended from and including spider 10 is pendulous. If the period of roll of the ship on which the compass is mounted is the same as that of the above referred to pendulum, it will be seen that the latter would be oscillated through a large amplitude due to the roll. Although the above assumption is practically never found in practice, the period of roll of the ship may be aprpoximately an odd multiple of that of the pendulous system. In this case the pendulum would receive impulses in phase so as to set up violent oscillation through a large amplitude. This oscillation, if unchecked, would affect the compass in various ways among which are the following:

The pendulum might strike the stand, or the rings 28, 29 might move so far away from casings 40, 41 as to impose dangerous strains on the gyro motor leads, causing injury in either case to the parts named.

Besides the danger of mechanical injury, unchecked oscillations of the gyroscope give rise to serious disturbing forces by deflecting the compass away from the meridian. This deflection is most pronounced when the ship is rolling in an intercardinal plane. The action of the forces during such swinging is illustrated in the diagrams shown in Figs. 8 to 11. In these figures the showing is simplified by illustrating one compass wheel 41 suspended on horizontal axis 43 in ring 29; the ring being pendulously supported from point f by wire e. The forces acting upon the compass may be separated into acceleration forces due to change of velocity of the pendulum and centrifugal forces, due to the fact that the compass moves in the arc of a circle. We will first consider the effect of acceleration forces.

If we assume the compass to be swinging NE. to SW., as shown in Fig. 9, the horizontal plane of the acceleration forces may be represented by the arrows X Z and X' Z' and may be resolved in components X Y, X' Y', Y Z, Y' Z'. The components X Y and X' Y' will cause all of the parts shown first to swing to the east and then to the west causing point $i$ which represents the center of gravity of the wheel end casing about pivots 43 to stand part of the time to the right and part of the time to the left of the vertical line drawn through the center of the wheel.

The component of the force Y Z having a positive lever arm will produce a torque in a counter-clock-wise direction about the vertical axis as shown by curved arrow $m$ and the component Y' Z' having a negative lever arm will also cause a counter-clock-wise torque as shown by the dotted line $m'$.

It is thus seen that these two components of torque added will result in the north end of the compass deflecting to the west. Of course, if the compass is swinging to the NW. and SE. point, the torque will be in the other direction.

Considering next the effect of the centrifugal force, it has been found that if a bar $a$, Fig. 10, be suspended by means of a loop $b$ and a thread $c$ and swung as a pendulum about an axis D, it will in time take up a position such that the bar $a$ will lie in a plane perpendicular to the axis of swing through D. This is illustrated in Fig. 11 in which A represents the bar, and $a-b$ the axis about which the pendulum is swung. The arrows represent the direction in which the bar should be turned.

On reference to Fig. 8, it will at once be seen that the vertical ring 29, and casing 41 of the compass, i. e., the entire sensitive element with the exception of the rotor, will act substantially as a rod A, above described, thereby tending to turn the compass in the plane of direction of swing. If this plane is intercardinal, it will at once be seen that this will cause the deflection of the compass. The rotor does not enter in any way in causing a deflection of this character, since it is free to turn on its bearing about an axis perpendicular to the plane of Fig. 8, and is stabilized about an axis passing through the horizontal bearing 43 on case 41. It will appear therefore that unless the entire sensitive element is perfectly balanced about both horizontal axes, that an error will be produced due to the centrifugal force of rolling on an intercardinal course.

While in the design of the compass an attempt is made to overcome the effect of these disturbing forces by means other than illustrated in this invention, it is found that the improvement effected by this invention will always increase the accuracy of the compass by keeping the oscillations of the compass within small bounds.

A third cause of deflection is the combined roll and pitch of the ship. It has been found that when a ship pitches while rolling that very severe oscillations of the gyroscopic unit are set up and a torque exerted about the vertical axis of the gyroscope tending to cause deflection.

The present invention aims to prevent the above mentioned danger of breakage of parts and the introduction of errors into the indications by damping out or absorbing the energy tending to oscillate the pendulous system.

One form of the invention is shown in Figs. 1 to 5. A damping means 75 is interposed between the ring 9 and spider 10 adjacent either or both of the pivots 9' and a similar means is interposed between rings 8 and 9 adjacent either or both of pivots 110. As these various damping means are all similar a detailed description of one will suffice for all. Calling attention to Figs. 2 to 5 it will be seen that I have provided a friction band 76 around the bearing casing 77, which casing is secured to one of the rings 9. The band 76 may be provided with an adjustable set screw 78 and a packing ring 79 of rubber or other suitable material whereby the said band 76 may be fixed with relation to casing 77 and hence also with relation to ring 9. A friction block 80 is secured to the other ring 8. In order that the pressure of the block 80 on the band 76 may be regulated or adjusted I prefer to provide a spring support for said block. One type of spring support is shown in Figs. 2 to 5. The block 80 is shown as detachably held in a cup 81 secured to a spring 82. Two clamps 83 carried by the ring 8 each carry on the inner side an L-shaped bracket 84, each of which in turn supports a threaded rod 85. The ends of spring 82 may be carried by rods 85 between nuts 86 and 87 whereby the pressure of the block 80 on band 76 may be adjusted.

Although the block 80 and band 76 might be made of various materials, I prefer to make the block of carbon and the band of steel. I have found, in practice, that this combination possesses long life, freedom from sticking and gives a good frictional damping force.

As the errors due to pitching and rolling are inappreciable when the amplitude of oscillation is small and as there is practically no likelihood of breakage of parts under this condition, I prefer to design the above described parts so that there is practically no damping due to the friction couple 76, 80 for small oscillations. Thus I have shown (see Fig. 2) that portion of the outer surface of band 76 which is adjacent the block 80 as having a greater radius of curvature than the remaining portion so that the surface immediately under the block 80 (when the parts are in normal central position) lies at a distance from the pivot 110 less than the radial distance of the major portion of the band. Furthermore the outer extremities of the surface 88 lie above the outer surface of the major portion of the band. By virtue of this arrangement it is obvious that the pressure of the block 80 on the surface 88 and consequently the damping force exerted between rings 8 and 9 increases as the amplitude of swing increases, there being little or no resistance to oscillations of small amplitude.

I have found that the above described simple structure practically eliminates damage to the parts and errors in indication due to pitching and rolling as large amplitude oscillations of the pendulous system are prevented.

Another form of damping means is illustrated in Figs. 6 and 7. In this form one or more dashpots 89 are carried by a two part clamping ring 90 adapted to grip the bearing casing 77 of one of the rings such as the ring 10. The pistons 91 of the dashpots are shown as pivotally connected to the opposite ends of a double arm lever 92 centrally pivoted at 93 to an upstanding lug 94 on the clamp 90. The lever 92 is suitably connected as by means of a link 95 to an adjacent gimbal ring 9. The link 95 is pivotally connected at one end to the arm 92, by means of a pin 96 and at its other end to the ring 9 by means of a pin 97. In order to increase the damping force I may provide a quantity of comparatively heavy oil in each of the dashpots.

In operation the last described form of the invention is similar to that of the one first described. It will be noticed that with the dashpot form, as in the other case, there is but little opposition to oscillations of small amplitude for in this case the relative movement of rings 9 and 10 and hence of the dashpots and their pistons is small and consequently comparatively slow. When the movement of the pistons (which are of a loose fit) with relation to the dashpots is slow the oil oozes past the pistons slowly and little or no damping force is exerted. As the amplitude increases, however, the damping force is increased as the pistons then move at a greater speed.

It should be borne in mind that my invention is independent of the particular style of compass employed, the compass disclosed having been selected merely to illustrate one application of the invention.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted and some of the features of each modification may be embodied in the others without interfering with the more general results outlined, and the invention extends to such use.

Having described my invention, what I claim and desire to secure by Letters Patent is:

1. A gyro-compass comprising in combination, a support, a gyroscopic unit pendulously suspended therefrom, and damping means for suppressing the oscillations of said unit.

2. In combination, a directionally sensitive gyroscopic unit, a support for pendulously supporting said unit, and means interposed between said support and unit for damping oscillations of the latter.

3. In combination, a support, a directionally sensitive device pivotally connected to said support, an element connected to said support, and a second element connected to said device and frictionally engaging said first named element.

4. In combination, a plurality of Cardan rings, a directionally sensitive gyroscopic element carried by one of said rings and energy absorbing means interposed between said rings.

5. In a compass, a plurality of gimbal rings, a pendulum connected to one of said rings and friction means comprising a plurality of elements interposed between said rings one of said elements being of carbonaceous material and another of said elements being of metal.

6. In a compass, a plurality of gimbal rings, a friction element of metal connected to one of said rings and a coöperating element of carbon connected to another of said rings and adapted to engage said friction element.

7. In a compass, a support, a pendulum pivotally connected to said support, friction means interposed between said pendulum and said support, said means adapted to increase the frictional force as the amplitude of oscillation increases.

8. In a compass, a universally mounted directionally sensitive pendulous device and means for damping out oscillations of said pendulum of comparatively large amplitude but permitting oscillations of small amplitude.

9. In a compass, a support, a gimbal ring pivoted to said support, and a friction damper interposed between said ring and support adjacent a pivot, one of the elements of said damper having a surface of less curvature than the arc of a circle centered at the pivotal point, and of a radius equal to the distance between said center and another element of said damper when the parts are in normal position.

10. In a compass, a plurality of gimbal rings, a friction element mounted on one or more of said rings adjacent the pivotal axis thereof and having a surface adapted to be engaged by a coöperating friction element on another of said rings, said surface comprising portions unequally spaced from the above mentioned pivotal axis.

11. In combination, a pendulous gyroscopic directionally-sensitive element, means comprising a plurality of bearings supporting said element for oscillation about a plurality of horizontal axes, and means for damping oscillations of said element about said horizontal axes.

12. In combination, a pendulous gyroscopic directionally-sensitive element, means comprising a plurality of bearings supporting said element for oscillation about a plurality of horizontal axes, and means for imposing a damping torque, on said element about said horizontal axes, which increases with the amplitude of oscillation.

13. In combination, an element mounted for oscillation about a normally horizontal axis, a gyroscopic directionally-sensitive element connected to said element and movable about a vertical axis with respect thereto and damping means connected to said element for opposing oscillations thereof about said normally horizontal axis.

14. In combination, an element mounted for oscillation about a normally horizontal axis, a second element pivotally connected to said first element for oscillation with respect thereto about a second normally horizontal axis, a gyroscopic directionally-sensitive element connected to said second element and movable about a vertical axis with respect thereto, damping means connected to said first element for opposing oscillations thereof and damping means connected to said second element for opposing oscillations thereof.

In testimony whereof I have affixed my signature.

HARRY L. TANNER.